United States Patent

Bohley

[15] 3,649,852

[45] Mar. 14, 1972

[54] TRIGGER CIRCUIT UTILIZING A PAIR OF LOGIC GATES COUPLED IN PARALLEL CURRENT PATHS

[72] Inventor: Thomas K. Bohley, Colorado Springs, Colo.

[22] Filed: Mar. 10, 1971

[21] Appl. No.: 122,695

[52] U.S. Cl. ....................307/289, 307/254, 307/218

[51] Int. Cl. ....................H03k 17/00

[58] Field of Search ....................307/253, 254, 218, 256, 289; 330/30 D

[56] References Cited

UNITED STATES PATENTS 3,446,989 5/1969 Allen et al. ....................307/254 X

*Primary Examiner*—Donald D. Forrer
*Assistant Examiner*—B. P. Davis
*Attorney*—A. C. Smith

[57] ABSTRACT

A triggering circuit for producing an oscilloscope sweep trigger signal employing a pair of parallel current paths, one path including one input of a first logic gate and a current control device coupled thereto and the second path including one input of a second logic gate and a second current control device coupled thereto. Feedback circuits couple the output of each gate to said input of each gate for regenerative feedback. A reset control signal is coupled to a second input of each gate. The output of said one gate is coupled to a third input of said second gate. A sync signal controls each of said current control devices to control the current through each path for operating said gates in sequence, said first gate operating at a preselected level in one half cycle of said sync signal and said second gate operating at a preselected level in the next half cycle of said sync signal to produce said triggering signal.

8 Claims, 8 Drawing Figures

INVENTOR
THOMAS K. BOHLEY
BY A. C. Smith
ATTORNEY

TRIGGER CIRCUIT UTILIZING A PAIR OF LOGIC GATES COUPLED IN PARALLEL CURRENT PATHS

BACKGROUND OF THE INVENTION

Cathode ray oscilloscope systems require an input triggering circuit which is synchronized with the signal to be displayed so that the sweep of the oscilloscope will be initiated at the desired time. A reset signal is provided from the oscilloscope system when the oscilloscope is ready or able to accept the sweep triggering signal.

In a present form of triggering circuit, two parallel connected tunnel diodes are employed, one tunnel diode acting as a gate and trigger tunnel diode to deliver the trigger pulse, and the second tunnel diode being utilized as a control diode. This form of triggering circuit is described in U.S. Pat. application Ser. No. 814,586 filed on Apr. 9, 1969 by Richard H. McMorrow, Jr., issued on Nov. 23, 1971 as U.S. Pat. No. 3,622,805 entitled "Trigger Circuit" and assigned to the same assignee as the subject patent application.

This known form of triggering circuit includes a first and second current path connected in parallel between a reference potential and a first adjustable current source. Each of the current paths has a serially connected current control device or transistor and one of said tunnel diodes, each of which exhibits a negative resistance characteristic and a triggering current level at which it shifts from a low to a high voltage state of operation. A second current source supplies a second current to the junction between the gating tunnel diode and the current control transistor in the first current path and a third current source is adapted to supply a third current to the junction between the control tunnel diode and the current control transistor in the second current path; the reset signal is applied to the latter junction. A sine wave synchronizing signal is differentially applied to control the current in the two current control transistors. An impedance circuit couples said two junctions together.

In operation, the reset signal is applied to the control diode junction, and thereafter, when the sync signal first reaches a predetermined level in a particular one of its half cycles, the current through the current control transistor connected in series with the control diode is increased to the point where the control diode changes to its high voltage state, which tends to draw a certain current through the gating tunnel diode via said impedance circuit. As the sync signal changes, a predetermined level is reached in the following half cycle where the current through the transistor connected in series with the gating diode is increased sufficiently to trigger the gating diode into its high state and deliver a trigger pulse to the oscilloscope.

This triggering system is very fast and thus suitable for high frequency oscilloscope systems. No separate triggering pulses have to be formed since the sine wave synchronizing signal directly produces the switch in state of the gating diode. The hysteresis effect is employed to condition the gating diode by a change in state of the control diode at one level of the sync signal, and by triggering the gating diode at a second level of the sync signal.

However, in such a system it is necessary to set accurately the three current sources so as to properly balance the circuit. It is also necessary that the tunnel diodes be carefully biased to prevent them from changing state at undesired times, and a minimum bias current must always be present. In addition, tunnel diodes are fairly unreliable and are also easily damaged during production and assembly.

SUMMARY OF THE INVENTION

In the present invention, a two current path triggering circuit is utilized wherein logic gates replace the tunnel diodes as the control gate and the triggering gate, each current path including a current control transistor for controlling the current in one input of the associated gate responsive to the sync signal. The reset signal source is coupled to second input of each of the trigger gate and the control or arm gate.

The noninverting output of the triggering gate serves as the trigger signal to the utilization circuit, e.g., the oscilloscope sweep.

The output of each gate is also connected via a feedback circuit to said one of its inputs, such that current may be drawn from said input by the associated current control transistor, to cause the associated gate to regenerate and switch to its low state at the preselected amplitude level of the sync signal.

In this system, only one current source need be adjusted. In addition, when the gate switches to its low state, it will not switch back to its high state even if the input current should be reduced to zero. Also, logic gates are very reliable and less subject to damage than tunnel diodes. Since they do not require carefully biasing as do tunnel diodes, logic gates provide for more easily designed triggering circuits.

DESCRIPTION OF THE PREFERRED EMBODIMENT

Figure 1:
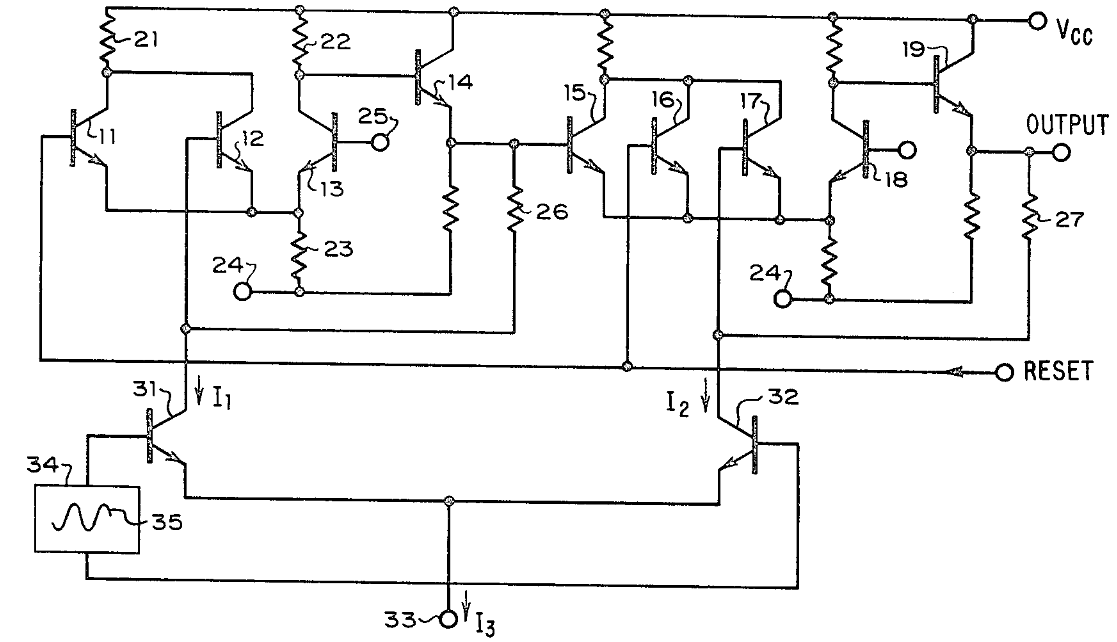
FIG. 1 is a schematic diagram of a preferred embodiment of the novel triggering circuit of the present invention.

Referring now to FIG. 1, the novel triggering circuit comprises a pair of logic gates coupled in parallel, one of said logic gates comprising two input transistors 11 and 12, a reference transistor 13, and an output transistor 14. The other logic gate comprises three input transistors 15, 16 and 17, a reference transistor 18, and an output transistor 19.

Each gate is a current mode logic or current steering device having two parallel current paths. For example, the first logic gate comprises a first current path including resistor 21 and the collector-emitter paths of the two input transistors 11 and 12 and a second current path including resistor 22 and the collector-emitter path of the reference transistor 13, both coupled in common via resistor 23 to a voltage source 24. The base of the reference transistor 13 is connected to a reference voltage source 25.

When a high appears on the bases of either or both of the input transistors 11, 12, the associated transistor turns on, and current flows through this branch of the circuit. Since the voltage at the common coupled emitters of transistors 11 and 12 is then higher than the reference voltage on the base of reference transistor 13, the reference transistor is turned off, and the base of the output transistor 14 goes high to produce a high or noninverted output from the emitter junction of output transistor 14.

Conversely, when both input transistor bases go low, both transistors 11 and 12 are turned off, their emitter voltage goes lower than the reference voltage, and reference transistor 13 is turned on and conducts current through the second branch of the gate. The base of output transistor 14 goes low to give a low level output from the emitter junction.

The second gate circuit operates in similar manner to produce a noninverted output at the emitter of output transistor 19, this gate circuit providing an OR function responsive to the three inputs to transistors 15, 16, and 17.

The two gates are provided with feedback circuits comprising resistors 26 and 27, respectively, which couple the noninverted output of the associated gate back to one of its inputs, the base of transistor 12 for the first gate and the base of transistor 17 for the other gate. These feedback circuits serve to introduce positive feedback and regeneration to the associated gate.

Figure 2:
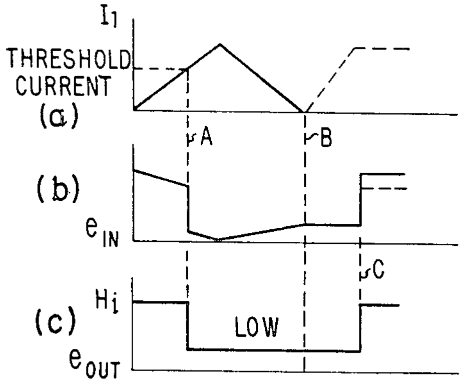
FIGS. 2*a*, 2*b*, and 2*c* are traces illustrating the current through one current control device coupled to a gate, the voltage at the input of the gates, and the voltage at the output of the gate, respectively, at regeneration of the gate.

In operation, and assuming input transistor 12 is on and a high exists on the emitter of output transistor 14, if an increasing current $I_1$ is drawn from the junction of the base of input transistor 12 and the feedback circuit 26, the voltage $e_{in}$ on the base of transistor 12 will decrease as illustrated in FIG. 2. A value of current will be reached at which the input will be brought into its active region and at this time the noninverted output $e_{out}$ will begin to fall, thus lowering the voltage $e_{in}$ even further and causing the noninverting output at the emitter of transistor 14 to assume the low state (point A).

If the input current is reduced to zero (point B), the output does not resume its high state. The noninverting output can be made to assume a high state again, whether the input current is zero or not, by taking the base of transistor 11 high (point C). In addition, the noninverting output can be prevented from going low with increasing input current $I_1$ as described above by maintaining the input of transistor 11 high during such time.

The second gate including feedback circuit 27 operates in a similar manner responsive to current flow $I_2$.

The input of transistor 12 in the first gate is coupled to the collector of a first current path, and the input of transistor 17 in the second gate is coupled to the collector of a second current control transistor 32 in a second current path parallel to the first path. The emitters of current control transistors 31 and 32 are coupled in common to a suitable current source 33 for supplying current $I_3$ to these parallel current paths. The current $I_3$ is adjusted so that there is insufficient current to trigger both gates simultaneously.

The bases of the two current control transistors 31 and 32 are coupled differentially to either side of a source 34 of a synchronizing signal 35, e.g., a sine wave, such that the sync signal is applied in opposite polarity to the respective bases. Since there is insufficient current to trigger both gates simultaneously, a finite hysteresis zone H is provided between the arm level above which the trigger signal must swing to cause the first or arm gate to regenerate and the trigger level below which the trigger signal must swing to cause the second or trigger gate to regenerate (FIG. 3*a*).

Figure 3:
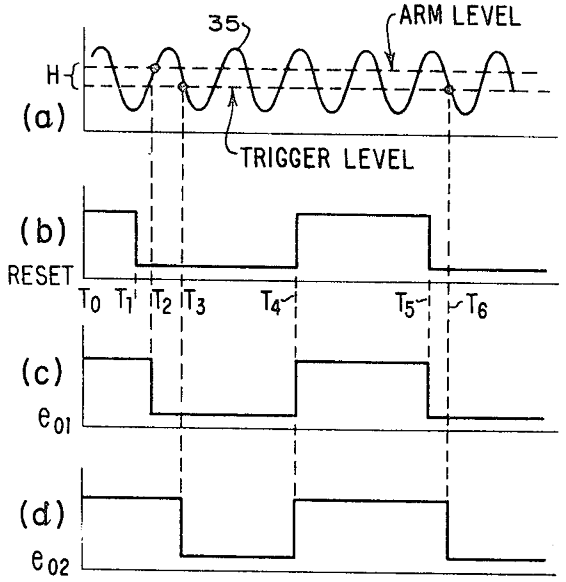
FIGS. 3*a*, 3*b*, 3*c*, and 3*d* are traces illustrating the sync signal, reset signal, and the outputs of the two gates, respectively, during two triggering situations.

FIGS. 3*b*, 3*c*, and 3*d* illustrate two situations encountered in oscilloscope triggering. In the first situation, the reset line from the oscilloscope circuit is high at time $T_0$ to the bases of input transistors 11 of the arm gate and 16 of the trigger gate, and the sweep is off. At time $T_1$ when the reset input goes low, the sync signal 35 is lower than the trigger level which would normally cause transistor 32 to turn on, increasing current $I_2$ and, as described above, causing the output of the transistor 19 to go low to the oscilloscope circuit. The trigger gate is prevented from going low because the high output at transistor 14 of the arm gate holds the input transistor 15 of the trigger gate high, to retain the noninverting output high.

At time $T_2$ when the sync signal swings above the arm level at the base of current control transistor 31, the current $I_1$ increases to a value sufficient to cause the arm gate to regenerate as described above and assume a low state at its output. Input transistor 15 of the trigger gate is turned off; however, the trigger gate remains unchanged since the sync signal is above the trigger level as can be seen in FIG. 3*a* and there is insufficient current $I_2$ to cause the trigger gate to regenerate.

At time $T_3$, when the sync signal crosses the trigger level, current $I_2$ increases to a value sufficient to cause the trigger gate to regenerate and produce a low at the emitter output of transistor 19 to initiate the sweep in the oscilloscope. When the sweep is completed at time $T_4$, the reset signal goes high forcing the outputs of both gates high irrespective of the state of the sync signal.

In the second situation, the reset signal goes low at a time $T_5$ when the sync signal is above the arm level. Under this condition the current $I_1$ is sufficiently large and the arm gate immediately regenerates to a low output state. The current $I_2$ in the second current path is below the value needed to regenerate the trigger gate so the output of the trigger gate remains high. At the time $T_6$ when the sync signal crosses the trigger level, sufficient current $I_2$ flows to cause regeneration of the trigger gate and its output goes low to the oscilloscope to initiate the sweep.

Since in both situations the trigger gate regenerates at the moment the sync signal crosses the trigger level, a stable oscilloscope display results.

This system utilizing regenerative logic gates in the two current paths has the advantage over the use of tunnel diodes in that only one current value $I_3$ needs to be set accurately, whereas the tunnel diode circuit requires that at least three currents be properly balanced. Furthermore, once the logic gates regenerate to a low state output, their outputs will remain low until the high level reset signal is received on one input of each gate from the oscilloscope circuitry. Tunnel diodes must be carefully biased to prevent them from changing state at undesired times.

I claim:

1. A triggering circuit comprising first and second logic gates each having an output and a plurality of inputs;
 - a first current path coupled to one input of said first logic gate, said first current path including a first current control device for controlling the current in said path;
 - a second current path coupled to one input of said second logic gate, said second current path including a second current control device for controlling the current in said second path;
 - a current source coupled in common to said two current paths;
 - a source of a sync signal variable about two amplitude levels coupled to both of said current control devices adapted to turn on one of said current control devices at one amplitude level and to turn on the other of said current control devices at the other amplitude level;
 - a first feedback circuit coupled between the output of said first gate and said one input of said first gate;
 - a second feedback circuit coupled between the output of said second gate and said one input of said second gate;
 - means for coupling a reset signal to a second input of each of said logic gates; and
 - circuit means coupling the output of said one logic gate to a third input of said second logic gate.

2. A triggering circuit as claimed in claim 1 wherein each of said logic gates comprises a plurality of input transistors coupled in parallel in one current path of the gate, a reference transistor coupled in a second current path in the gate parallel to said one current path, and an output transistor coupled to one of said latter current paths.

3. A triggering circuit as claimed in claim 2 wherein said feedback circuits for each gate comprise a resistance circuit coupling the output of said output transistor with the base of one of said input transistors.

4. A triggering circuit as claimed in claim 2 wherein said one logic gate comprises two input transistors and wherein said second logic gate comprises three input transistors.

5. A triggering circuit as claimed in claim 1 wherein each of said current control devices comprises a transistor with its emitter-collector circuit in said current path and its base coupled to said sync signal source.

6. A triggering circuit as claimed in claim 5 wherein each of said logic gates comprises plurality of plurality of input transistors coupled in parallel in one current path of the gate, a reference transistor coupled in a second current path in the gate parallel to said one current path, and an output transistor coupled to one of said latter current paths.

7. A triggering circuit as claimed in claim 6 wherein said feedback circuits for each gate comprise a resistance circuit coupling the output of said output transistor with the base of one of said input transistors.

8. A triggering circuit as claimed in claim 6 wherein said one logic gate comprises two input transistors and wherein said second logic gate comprises three input transistors.

* * * * *